A. R. WILEY.
CULTIVATOR FENDER ADJUSTER.
APPLICATION FILED NOV. 8, 1917.
1,260,841.
Patented Mar. 26, 1918.
Fig. 1.
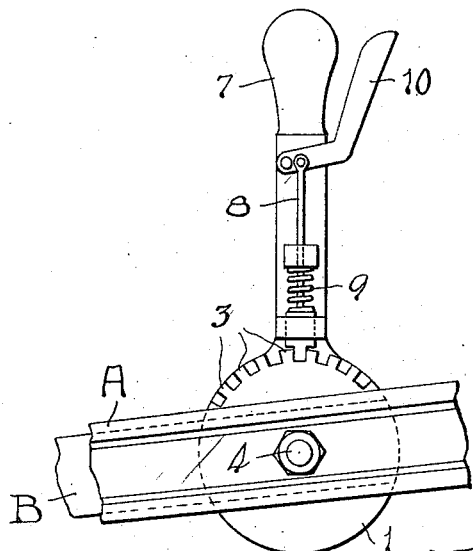
Fig. 2.
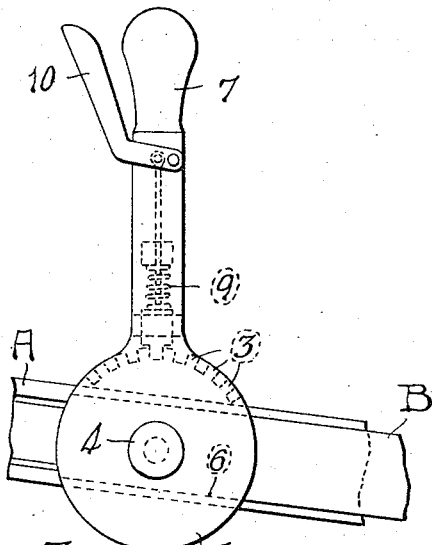
Fig. 4.
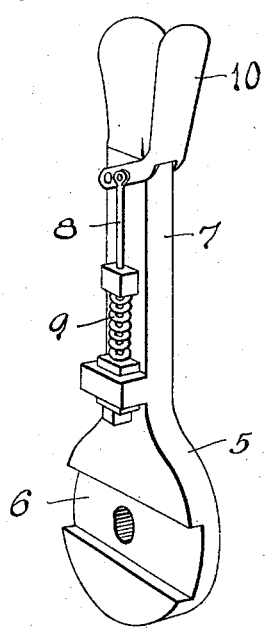
Fig. 3.
Fig. 5.
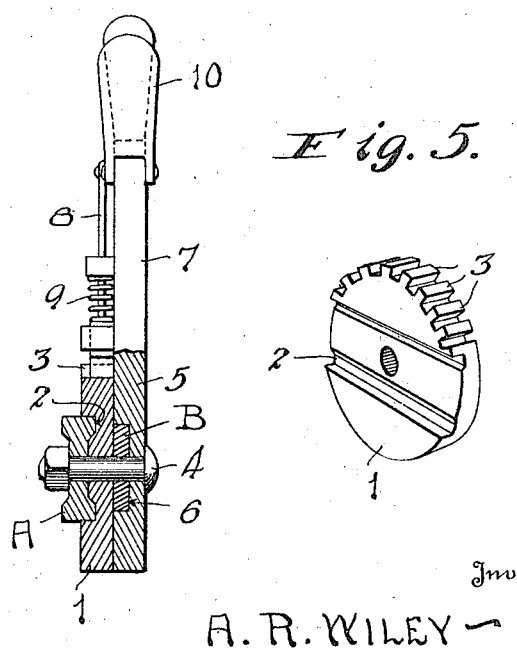
Inventor
A. R. WILEY
By  H. S. H———
Attorney

UNITED STATES PATENT OFFICE.

ALBERT RUSSELL WILEY, OF MANKATO, KANSAS.

CULTIVATOR-FENDER ADJUSTER.

1,260,841.  Specification of Letters Patent.  Patented Mar. 26, 1918.

Application filed November 8, 1917. Serial No. 200,938.

*To all whom it may concern:*

Be it known that I, ALBERT RUSSELL WILEY, a citizen of the United States, residing at Mankato, in the county of Jewell, State of Kansas, have invented a new and useful Cultivator-Fender Adjuster; and I do hereby declare the following to be a full, clear, and exact description of the invention, such as will enable others skilled in the art to which it appertains to make and use the same.

The present invention relates to an adjustable mounting for cultivator fenders, and has for its object to provide a device of this character which embodies novel features of construction whereby the fender beam can be swung up or down to raise or lower the fender and firmly locked in an adjusted position.

Further objects of the invention are to provide a device of this character which is comparatively simple and inexpensive in its construction, which can be readily applied as an attachment to any conventional cultivator, which will enable the fender to be easily and quickly adjusted in the desired manner, and which is reversible, being adapted to be applied to either side of the cultivator.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a cultivator fender adjuster constructed in accordance with the invention, showing the same as applied to a cultivator beam, a portion only of the cultivator beam being shown.

Fig. 2 is a similar view, looking at the fender adjuster from the opposite side thereof.

Fig. 3 is a front view of the device, parts being broken away and shown in section.

Fig. 4 is a detail perspective view of the rotatable plate and operating lever.

Fig. 5 is a similar view of the ratchet disk.

Corresponding and like parts are referred to in the following description and indicated in all the views of the drawings by the same reference characters.

Referring to the drawings, which illustrate one embodiment of the invention, the reference character A designates a fragmentary portion of a cultivator beam, and B a fragmentary portion of a fender beam, the said members being of well-known and conventional construction. A ratchet disk 1 is fitted against one side of the cultivator beam A, being provided with a diametrically disposed depressed seat 2 which has the base thereof shaped to conform to the contour of the cultivator beam and interlock therewith. The upper edge of the disk 1 is notched to provide a segmental rack 3, while a bolt 4 extends centrally through the disk and cultivator beam A to hold the disk in position upon the cultivator beam. A circular plate 5 fits rotatably against the outer face of the disk 1, being pivotally mounted upon the end of the bolt 4 and held in position against the disk by means of the said bolt. This circular plate 5 is of the same size as the disk 1, the latter providing a bearing surface against which the plate rotates. The inner face of the plate is provided with a diametrically extending grooved seat 6 which receives the fender beam B, said beam being held in position within the seat by the disk 1, and being also engaged by the bolt 4 which passes through the same. An operating lever 7 is rigid with the circular plate 5 and extends upwardly therefrom, said lever carrying a latch member 8 which is normally held in engagement with the segmental rack 3 of the disk 1 by means of a spring 9. A latch lever 10 is mounted in the conventional manner upon the operating lever 7 and connected to the member 8 so that the latch member can be readily retracted into an inoperative position when it is desired to manipulate the operating lever and rotate the circular plate 5 upon the bolt 4 to swing the fender beam B up or down. It will thus be obvious that the fender can be readily raised or lowered and the position thereof adjusted in the desired manner. The device is adapted to be attached to either beam of the cultivator and the latch lever 10 is preferably reversible, so that it can be applied to the lever in such a manner as to face toward the front of the machine, regardless of which beam the attachment is applied to.

Having thus described the invention, what I claim as new and desire to secure by Letters Patent, is:—

1. In a device of the character described, the combination with a relatively fixed beam, of a circular disk fitted rigidly against one side of the fixed beam and having a segmental rack at one edge thereof, a circular plate fitted rotatably against the disk and provided upon its inner face with a diametrically disposed depressed seat, a beam fitted within the seat so as to be adjustable by rotating the plate, means for adjusting the plate upon the disk, and means for locking the plate with the disk.

2. In a device of the character described, the combination with a relatively fixed beam, of a disk fitted rigidly against one side of the fixed beam and having a segmental rack at one edge thereof, a rotatable plate fitted against the disk and provided upon the inner face thereof with a diametrically extending depressed seat, a pivot bolt connecting the plate to the disk and also securing the disk to the fixed beam, a beam fitted within the seat of the plate, so as to be adjustable by rotating the plate, a handle for rotating the plate, and latch means upon the handle for engagement with the segmental rack of the disk to lock the plate in an adjusted position.

3. In a device of the character described, the combination with a relatively fixed beam, of a circular disk proveded upon one side thereof with a diametrically extending grooved seat adapted to receive and interlock with the fixed beam, a circular plate fitted rotatably against the disk and provided upon its inner face with a diametrically disposed depressed seat, a pivot bolt connecting the plate to the disk and also connecting the disk to the fixed beam, a beam fitted within the seat of the plate so as to be adjustable by rotating the plate, and means for locking the plate in an adjusted position.

4. In a device of the character described, the combination with a relatively fixed beam, of a disk fitted against one side of the fixed beam and provided with a diametrically extending grooved seat receiving and interlocking with the fixed beam, said disk having a segmental rack at one edge thereof, a rotatable plate fitted against the outer face of the disk and provided with a diametrically extending depressed seat in one side thereof, a beam fitted within the said seat so as to be adjustable by rotating the plate, an operating lever projecting from the plate, and latch means upon the lever for engagement with the segmental rack of the disk to lock the plate in an adjusted position.

5. In a device of the character described, the combination with a relatively fixed beam, of a circular disk provided in one side thereof with a diametrically extending grooved seat adapted to receive and interlock with the fixed beam, the upper edge of the disk being notched to provide a segmental rack, a circular plate fitted rotatably against the circular disk and provided upon its inner face with a diametrically extending depressed seat, a pivot bolt extending centrally through the plate and disk and also extending through the fixed beam, a beam fitted within the seat of the plate and also engaged by the bolt, an operating lever projecting from the plate for rotating the same to adjust the position of the movable beam, and latch means upon the operating lever for engagement with the segmental rack of the disk to lock the plate in an adjusted position.

In testimony whereof I have signed my name to this specification in the presence of two subscribing witnesses.

ALBERT RUSSELL WILEY.

Witnesses:
D. H. STAFFORD,
LEROY MUSTOE.

Copies of this patent may be obtained for five cents each, by addressing the "Commissioner of Patents, Washington, D. C."